United States Patent
Hauschild et al.

(10) Patent No.: US 9,530,259 B2
(45) Date of Patent: Dec. 27, 2016

(54) METHOD AND DEVICE FOR DISPLAYING OPERATING STATES OF UNITS OF A VEHICLE

(71) Applicant: VOLKSWAGEN AG, Wolfsburg (DE)

(72) Inventors: Frank Hauschild, Berlin (DE); Mathias Kuhn, Berlin (DE); Sönke Petersen, Berlin (DE); Jian Lou, Berlin (DE)

(73) Assignee: Volkswagen AG, Wolfsburg (DE)

( * ) Notice: Subject to any disclaimer, the term of this patent is extended or adjusted under 35 U.S.C. 154(b) by 95 days.

(21) Appl. No.: 14/351,948

(22) PCT Filed: Oct. 9, 2012

(86) PCT No.: PCT/EP2012/004230
§ 371 (c)(1),
(2) Date: Apr. 15, 2014

(87) PCT Pub. No.: WO2013/053464
PCT Pub. Date: Apr. 18, 2013

(65) Prior Publication Data
US 2014/0277903 A1    Sep. 18, 2014

(30) Foreign Application Priority Data
Oct. 15, 2011   (DE) .......................... 10 2011 116 124

(51) Int. Cl.
*G07C 5/12*    (2006.01)
*B60K 37/06*   (2006.01)

(52) U.S. Cl.
CPC ................. *G07C 5/12* (2013.01); *B60K 37/06* (2013.01); *B60K 2350/1072* (2013.01);
(Continued)

(58) Field of Classification Search
CPC ............ B60K 35/00; B60K 2350/1004; B60K 2350/1072; G01C 21/00
(Continued)

(56) References Cited

U.S. PATENT DOCUMENTS 7,415,352 B2 *   8/2008   Olcott .................... B60K 35/00
                                                         701/400
8,239,087 B2 *   8/2012   Dybalski ................ B60K 35/00
                                                         345/156
(Continued)

FOREIGN PATENT DOCUMENTS

CN   101160225 A   4/2008
CN   101208219 A   6/2008
(Continued)

OTHER PUBLICATIONS

Office Action for Korean Patent Application No. 10-2014-7012885; Apr. 1, 2015.
(Continued)

*Primary Examiner* — Thomas G Black
*Assistant Examiner* — Wae Louie
(74) *Attorney, Agent, or Firm* — Barnes & Thornburg LLP (57) ABSTRACT

A method for displaying operating states of units of a vehicle wherein a control device generates graphics data which control a display device so that a first graphics object is displayed with a representation of the vehicle in a first state, and that a second graphics object is generated with a graphical representation of the vehicle unit which is displayed in the changed graphical representation of the vehicle so that the arrangement of the second graphics object of the vehicle unit in the first graphics object of the vehicle substantially corresponds to the real arrangement of the vehicle unit in the vehicle. Also disclosed is a corresponding (Continued)

device for carrying out this method and to a vehicle with such a device.

20 Claims, 4 Drawing Sheets

(52) U.S. Cl.
CPC *B60K 2350/1096* (2013.01); *B60K 2350/901* (2013.01); *B60K 2350/965* (2013.01)

(58) Field of Classification Search
USPC .................................................. 701/29.1, 400
See application file for complete search history.

(56) References Cited

U.S. PATENT DOCUMENTS

| 2005/0168330 | A1* | 8/2005 | Ono ........................ | B60K 35/00 |
| | | | | 340/461 |
| 2006/0265126 | A1* | 11/2006 | Olcott .................... | B60K 35/00 |
| | | | | 701/400 |
| 2014/0277903 | A1* | 9/2014 | Hauschild .............. | B60K 37/06 |
| | | | | 701/29.1 |

FOREIGN PATENT DOCUMENTS

| CN | 101304902 A | 11/2008 |
| DE | 19941956 A1 | 3/2001 |
| DE | 102004006605 A1 | 9/2005 |
| DE | 102005003920 A1 | 9/2005 |
| DE | 102005017313 A1 | 10/2006 |
| DE | 102006032118 A1 | 1/2008 |
| DE | 102007014530 A1 | 10/2008 |
| DE | 102010012239 A1 | 9/2011 |
| EP | 1974981 A2 | 10/2008 |
| JP | 2000148333 A | 5/2000 |
| KR | 1020080002753 | 1/2008 |
| WO | 2006108617 A2 | 10/2006 |

OTHER PUBLICATIONS

Search Report for German Patent Application No. 10 2011 116 124.8; Jun. 26, 2012.
Search Report for International Patent Application No. PCT/EP2012/004230; Apr. 15, 2013.

* cited by examiner

METHOD AND DEVICE FOR DISPLAYING OPERATING STATES OF UNITS OF A VEHICLE

PRIORITY CLAIM

This patent application is a U.S. National Phase of International Patent Application No. PCT/EP2012/004230, filed 9 Oct. 2012, which claims priority to German Patent Application No. 10 2011 116 124.8, filed 15 Oct. 2011, the disclosures of which are incorporated herein by reference in their entirety.

SUMMARY

Illustrative embodiments relate to a method for displaying operating states of units of a vehicle. In addition, illustrative embodiments relate to a device for displaying operating states of units of a vehicle. The device comprises sensors for detecting the operating states of the vehicle units, and a display device for displaying graphics objects for visualizing the operating states of the vehicle. In addition, the device comprises a control device which is coupled to the sensors and by means of which graphics data for displaying the graphics objects on the display device can be generated.

BRIEF DESCRIPTION OF THE DRAWINGS

Disclosed embodiments will now be explained with reference to the drawings, in which.

DETAILED DESCRIPTION OF THE DISCLOSED EMBODIMENTS

Disclosed embodiments provide a method and a device in which operating parameters of the motor vehicle can be taken in by the viewer quickly and intuitively.

In the method, a control device generates graphics data which actuate a display device in such a way that a first graphics object is displayed with a representation of the vehicle in a first state. In addition, the operating states of the vehicle units are detected and transmitted to the control device. The control device then checks whether information on an operating state needs to be output. In the case of a positive result of the check, i.e. if information on an operating state of a vehicle unit is to be output, the representation of the first graphics object is changed in such a way that the vehicle is represented in a second state from a viewing angle at which the vehicle unit, on the operating state of which information is to be output, is arranged at the front in the representation of the vehicle. Furthermore, a second graphics object is generated with a graphics representation of the vehicle unit is generated which is displayed in the changed graphics representation of the vehicle in such a way that the arrangement of the second graphics object of the vehicle unit in the first graphics object of the vehicle corresponds essentially to the real arrangement of the vehicle unit in the vehicle.

In the method, the graphics object for the vehicle unit, on the operating state of which information is displayed, is advantageously displayed in the graphics object for the vehicle in such a way that it is arranged at the front of the vehicle, with the result that the viewer can take in the graphics object of the vehicle unit particularly quickly and intuitively. A representation at the front with respect to the representation of the vehicle is understood to mean that the viewing angle of the graphics representation of the vehicle is selected such that the vehicle unit is located as far forward as possible from the point view of the viewer. This means that the viewer views the vehicle unit directly if the unit is located in the region of the outer shell of the vehicle. If the vehicle unit is located in the interior of the vehicle, the region for the representation of the vehicle covers the representation of the vehicle unit as little as possible. The representation of the second graphics object in the first graphics object is selected, in particular, in such a way that, on the one hand, it corresponds to the real arrangement of the vehicle unit in the vehicle, but on the other hand a viewing angle of the vehicle with the vehicle unit is represented in which the representation of the vehicle unit can be perceived as clearly as possible.

According to at least one disclosed embodiment of the method, the information on the operating state of the vehicle unit is output by means of the method of representation of the second graphics object or by means of a further graphics object. For example, the second graphics object can be displayed in a different color than the first graphics object to differentiate it clearly from the representation of the vehicle and to output a warning message, if appropriate. In addition, though the representation of a further graphics object it is possible to display additional information.

According to another disclosed embodiment of the method, the first graphics object represents the vehicle three-dimensionally. The representation can either be perspective or auto-stereoscopic. In the case of the perspective or auto-stereoscopic representation a specific viewing angle of the three-dimensional representation of the vehicle is calculated. The viewing angle is selected here in such a way that the vehicle unit can be perceived as clearly as possible at the front of the vehicle.

According to yet another disclosed embodiment of the method, when the representation of the first graphics object is changed, an image sequence is displayed in which the first graphics object changes from the first state into the second state. In particular, the representation of the vehicle is rotated in an animation in such a way that the vehicle unit in the vehicle can be perceived as clearly as possible in the graphics representation. By virtue of the image sequence, the viewer can particularly easily orient himself with respect to the representation of the vehicle since there is no abrupt transition between the two states.

According to a further disclosed embodiment of the method, in the first state the first graphics object represents a nontransparent outer skin of the vehicle. In contrast, in the second state the first graphics object represents the vehicle in a transparent fashion, wherein the second graphics object of the vehicle unit can be seen inside the vehicle if the vehicle unit is arranged in the interior of the vehicle. The graphics representation of the vehicle therefore changes from a nontransparent representation into a transparent representation to allow the graphics representation of the vehicle unit to be clearly viewed. This method of representation and this type of transition between the two states also makes it particularly easily and intuitively possible for the viewer to grasp the position of the vehicle unit and the associated operating state.

The first graphics object represents, for example, the vehicle from behind if the vehicle unit, on the operating state of which information is to be output, comprises the rear lights. In contrast, the first graphics object represents the vehicle from the front if the vehicle unit, on the operating state of which information is to be output, comprises the front headlights.

The device provides a control device that generates graphics data which actuate the display device in such a way that a first graphics object is displayed with a representation of the vehicle in a first state which can be changed in such a way that the vehicle is represented in a second state from a viewing angle at which the vehicle unit, on the operating state of which information is to be output, is arranged at the front in the representation of the vehicle, and a second graphics object is generated with a graphics representation of the vehicle unit, which second graphics object is displayed in the changed graphics representation of the vehicle in such a way that the arrangement of the second graphics object of the vehicle unit in the first graphics object of the vehicle corresponds essentially to the real arrangement of the vehicle unit in the vehicle.

The device is configures such that it can partially or completely carry out the method steps mentioned above. It therefore also has the same advantages mentioned above as the method.

Further disclosed is a vehicle having such a device.

Figure 1:
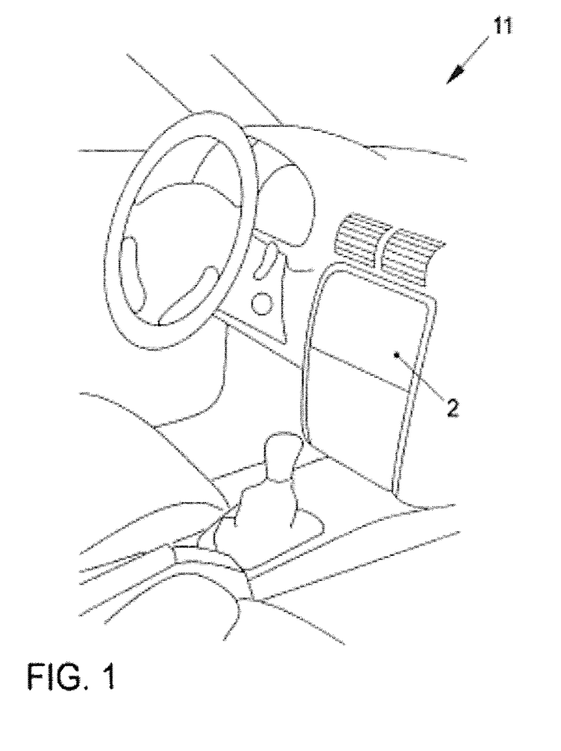
FIG. 1 shows a vehicle having the exemplary embodiment of the device disclosed.
Figure 2:
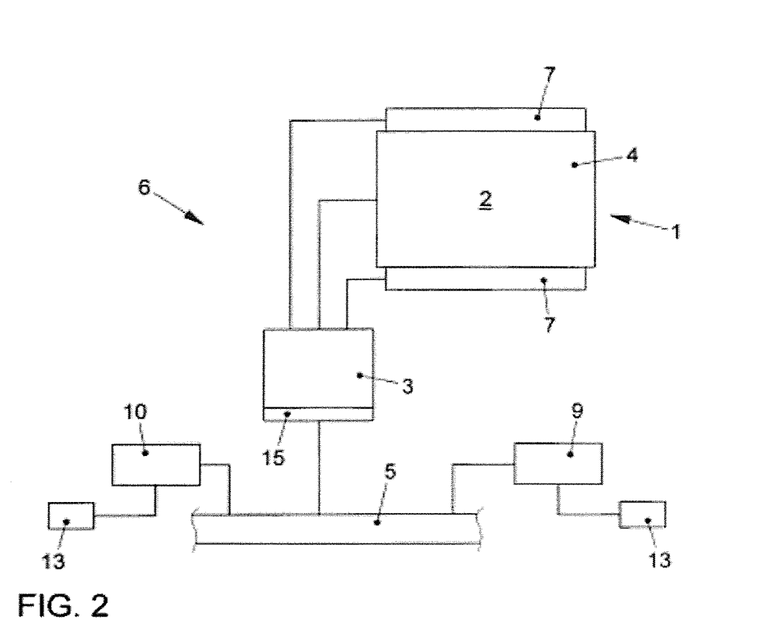
FIG. 2 shows a schematic view of an exemplary embodiment of the device disclosed and the connection of this device to other units of the vehicle.
Figure 3:
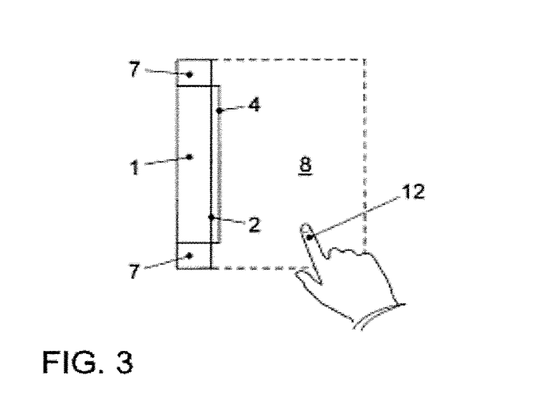
FIG. 3 shows a sectional view of the display device of the exemplary embodiment of the device disclosed.

Firstly, at least one exemplary embodiment of the device and the arrangement thereof in a motor vehicle 11 will be explained with reference to FIGS. 1 to 3.

A display unit 6 comprises a display device 1 having a display surface 2 which is arranged in the interior of the motor vehicle 11 in such a way that it can be viewed easily by at least one vehicle occupant, in particular the driver. The display surface 2 can be made available by a display, in particular a liquid crystal display, of any desired design.

The display unit 6 also comprises a control device 3 which is connected to the display device 1 and with which graphics data for representing information on the display surface 2 can be generated. Furthermore, the display unit 6 is coupled to an input device which is embodied as a touch-sensitive surface 4 on the display surface 2. A so-called touch screen is therefore made available.

Furthermore, the display unit 6 is coupled to a proximity sensing unit 7. By means of the proximity sensing unit 7 it is possible to sense an activation object 12, for example the fingertip of a user, in a detection region 8. The detection region 8 is illustrated in detail in FIG. 3. The detection region 8 is formed in such a way that a movement of an activation object 12 toward the touch-sensitive surface 4 on the display surface 2 is sensed.

In the exemplary embodiment described here, the detection region 8 forms at least one volume in front of the touch-sensitive surface 4. In particular a square is formed which, with its side faces, completely encloses the touch-sensitive surface 4 in the extent of the square which runs parallel to the touch-sensitive surface 4. In a direction perpendicular to the touch-sensitive surface 4, the square extends from the touch-sensitive surface 4 or directly in front of the touch-sensitive surface 4 up to a distance of, for example, approximately 40 cm. The distance of the outer boundary of the detection region 8 in front of the touch-sensitive surface 4 is selected in such a way that a movement toward the touch-sensitive surface 4 can be detected in such good time that the display on the display surface 2 can be changed early enough to assist the user during the inputting process. In addition, the distance of the detection region 8 from the touch-sensitive surface 4 is to be selected such that the activation object 12 or another object is moved as rarely as possible into the detection region 8 if there is no intention to carry out an operator control process of the touch-sensitive surface 4.

Further details of various embodiments of the proximity sensing unit 7 are described, for example, in WO 2011/051361 A1.

The proximity sensing unit 7 continuously transmits the current position of an activation object 12 in the detection region 8 to the control device 3. The control device 3 can change the display on the display surface 2 as a function of this signal.

Finally, the control device 3 is coupled to a data bus 5 via an interface 15. The control device 3 is coupled via this data bus 5 to further units 9, 10 of the motor vehicle 11, information on which is to be displayed on the display surface 2.

The units 9 and 10 are, for example, the drive engine of the vehicle 11, the rear lights of the vehicle 11 or tire pressure detectors. The units 9 and 10 are each connected to sensors 13 which detect operating states of the units 9 and 10. For example, a sensor 13 of the engine detects an oil level and transmits it via the data bus 5 to the control device 3. The sensor 13 for the rear lights detects whether a light source of the rear lights is defective and also transmits corresponding information to the control device 3. The sensor 13 for the tire pressure detector transmits the tire pressure to the control device 3.

In the text which follows, an exemplary embodiment of the method which can be carried out by the device described above is explained in detail with reference to FIGS. 4 to 7.

By means of an operator control process using the touch-sensitive surface 4 and in a manner known per se it is possible for the user to bring about a multifunction display of the motor vehicle 11 in a hierarchical menu structure which is displayed on the display surface 2, the display showing various operating parameters and operating states of the motor vehicle 11. Such a display is shown in FIG. 4.

A first graphics object 14 is displayed which represents the motor vehicle 11 perspectively in a view from obliquely above. In this context, in this first state of the representation of the vehicle 11 a nontransparent outer skin of the vehicle 11 is represented. To generate the graphics data for the representation of the first graphics object 14, the control device 3 can, for example have recourse to a surface envelope model of the vehicle 11, such as is described, for example, in EP 1 974 981 A1.

Furthermore, the control device 3 continuously evaluates the data transmitted by the sensors 13 and checks whether information on an operating state of a vehicle unit 9, 10 is to be output. Such an outputting can be initiated, on the one hand, by an input by the user. On the other hand, the control device 3 can check whether an operating state has exceeded a stored limiting value, with the result that a warning message has to be output.

Figure 4:
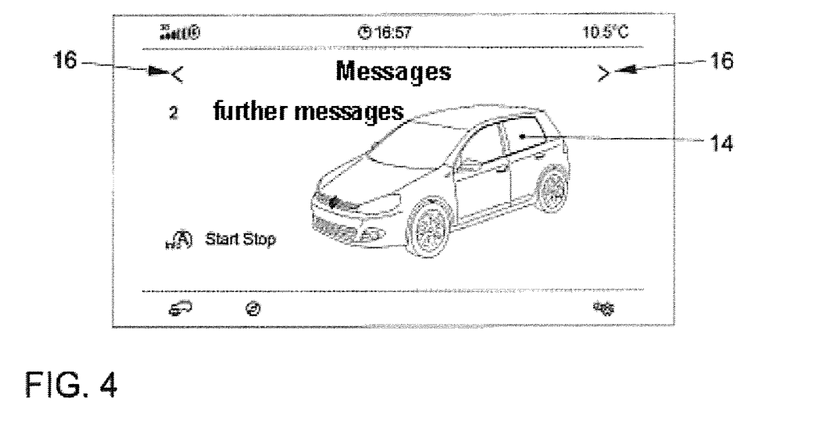
FIGS. 4 to 7 show displays represented by means of an exemplary embodiment of the disclosed method on a display surface.

If information on operating states of units 9, 10 of the vehicle 11 is to be output, the control device 3 generates indications of such messages in the display according to FIG. 4. In addition, control buttons 16, by means of which the user can call up displays which relate to the messages, are represented.

Figure 5:
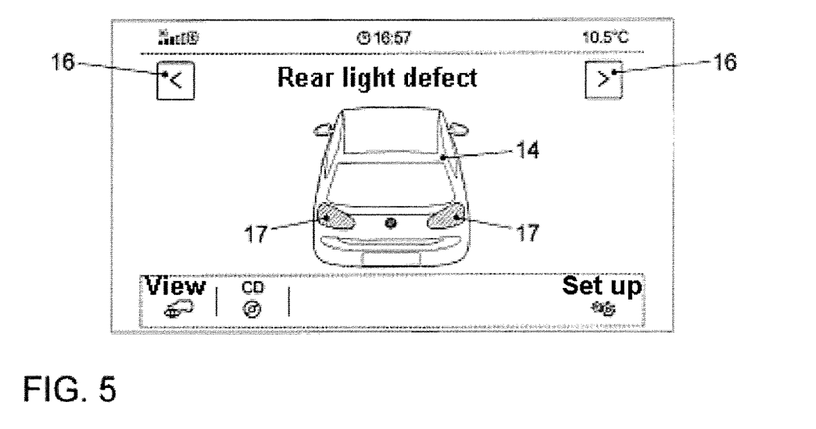

If the user activates one of the control buttons 16, for example the display which indicates a defect in the rear lights as represented in FIG. 5 is generated on the display surface 2. At the transition from the display according to FIG. 4 into the display according to FIG. 5, the first graphics object 14 for the vehicle 11 is rotated in such a way that the representation of the rear lights in the perspective illustration is arranged at the front. Furthermore, in the first graphics object 14 a second graphics object 17 for the rear lights is displayed. The second graphics object 17 is arranged in the first graphics object 14 in a way which corresponds to the real arrangement of the rear lights in the vehicle 11. To bring a defect in a light source of the rear lights to the user's attention, the first graphics object 14 is illustrated in gray, while in contrast the second graphics object 17 for the rear lights is represented in red so that the viewer is quickly informed of the defect in a light source of the rear lights.

Furthermore, a further graphics object 18 is displayed which indicates the defect in the rear lights in an alphanumeric fashion.

Figure 6:
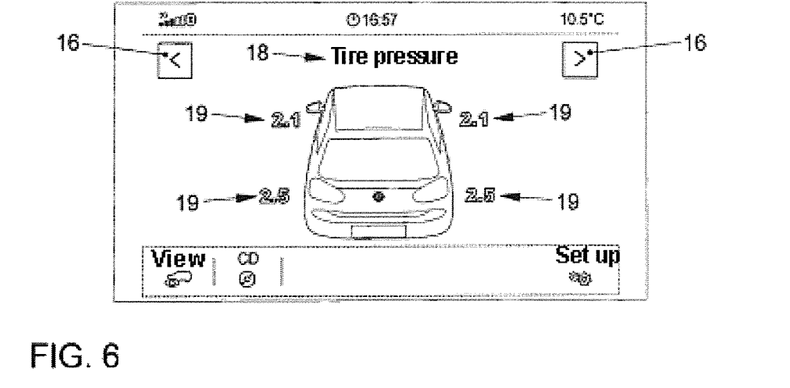

If a rear light defect was not present but instead the user had interrogated information about the current tire pressure by means of an input, the display represented in FIG. 6 would be represented, graphics objects 19 which indicate the measured values for the tire pressure being displayed in the display.

Figure 7:
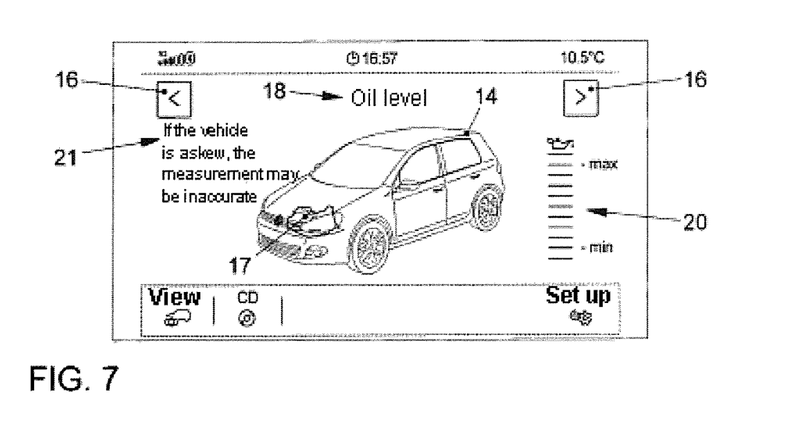

If the user calls up the second message by activating a control button 16, he arrives at the display represented in FIG. 7. In the case of the transition from the display according to FIG. 5 to the display according to FIG. 7, the first graphics object 14 for the perspective representation of the vehicle 11 is rotated again until the vehicle 11 is represented by the first graphics object 14 at a viewing angle at which the second graphics object 17, which in this case represents the engine of the vehicle 11, is displayed at the front. Since the engine is located in the interior of the vehicle 11, the first graphics object 14 of the vehicle 11 is then represented transparently, wherein the second graphics object 17 for the engine can be seen inside the representation of the vehicle. Furthermore, a graphics object 20 is displayed which visualizes the measured value for the oil level of the engine. Finally, a further graphics object 21 is also displayed, the graphics object 21 displaying an indication of the operating state of the engine.

With the increase in electronic units in a vehicle it has become necessary to represent a relatively large amount of information in the vehicle. Modern vehicles comprise, for example, not only a multifunctional display for displaying operating states of vehicle units but also a large number of driver assistance systems, the information of which has to be displayed in the vehicle. Furthermore, vehicles frequently comprise a navigation system. By means of such a navigation system it is possible to display digital geographics road maps with a route and, under certain circumstances, a wide variety of additional information. Finally, modern vehicles often comprise communication and multimedia applications, including a mobile telephone interface and units for playing back music and apeech. The vehicle must also have a facility for displaying information for these applications.

To be able to display the wide variety of information in a flexible way, for example freely programmable displays are used which frequently also perform the function of representing conventional mechanical instruments. DE 10 2006 032 118 A1 describes, for example, a combination instrument for a motor vehicle which comprises a display with which the speed of the motor vehicle, the rotational speed of the engine of the motor vehicle, the temperature of the engine of the motor vehicle, the filling level of the fuel tank and/or the time can be displayed in a variable fashion. It is also possible to display information of a navigation system, of a telephone, of a music system, of an infotainment system and/or of an air-conditioning system.

In addition to the combination instrument, a display device is frequently arranged above the center console of the vehicle, by means of which display device further information can be displayed. This display device is used, in particular, as a multifunctional display and for representing a geographics map of a navigation system. Such a multifunctional display is described, for example, in DE 199 41 956 A1.

Displaying information in a vehicle involves very specific requirements. The information in the vehicle is taken in, inter alia, by the driver. The information should therefore be represented in the vehicle in such a way that the taking in of information by the driver does not cause distraction while he is driving the vehicle. The information which is represented should therefore be capable of being grasped by the driver intuitively and quickly so that he only has to very briefly avert his gaze from the events on the road to take in the information. If the operator control of the vehicle units is assisted or prompted by a display, the display should be provided in such a way that the driver only has to look at the display very briefly for the control operation to carry out operator control.

EP 1 974 981 A2 discloses a method and a device for displaying states of units of a vehicle. In the method described in this document the states of the vehicle units are detected and transmitted to a control unit. Subsequently, image data for a graphics representation of a vehicle unit and its state are generated in a graphics representation of the vehicle, wherein the arrangement of the vehicle unit in the vehicle in the graphics representation corresponds essentially to the real arrangement. The image data are then represented by a display device in the vehicle. In this context, the graphics representation of the vehicle and of the vehicle units is carried out on the basis of a surface envelope model, wherein the transparency of the representation of the surface envelope model of the vehicle is selected in such a way that the represented vehicle units can be seen.

LIST OF REFERENCE NUMERALS

1 Display device
2 Display surface
3 Control device
4 Touch-sensitive surface, input device
5 Data bus
6 Display unit
7 Proximity sensing unit
8 Detection region
9 Unit of the vehicle
10 Unit of the vehicle
11 Motor vehicle
12 Activation object, fingertip
13 Sensors
14 First graphics object
15 Interface
16 Control buttons
17 Second graphics object
18 Graphics object
19 Graphics object
20 Graphics object
21 Graphics object

The invention claimed is:

1. A method for displaying operating states of vehicle components of a vehicle, the method comprising:
    generating, using a control device, graphics data which actuate a display device such that a first graphics object is displayed including a representation of the vehicle in a first state;
    detecting and transmitting the operating states of the vehicle components to the control device;
    determining, using the control device, whether additional information pertaining to at least one vehicle component operating state should be output via the display device;
    determining, in response to a determination that additional information should be output, a viewing angle that enables the representation of the vehicle in the first graphics object as to be represented in a second state in such a way that the at least one vehicle component with the operating state requiring additional information output is arranged at the front of the representation of the vehicle so as to appear most proximate to a user via the display device;
    generating and displaying a second graphics object including a graphics representation of the vehicle component; and
    changing the first graphics object to represent the vehicle in a second state based on the viewing angle so as to display the second graphics object so as to appear most proximate to the user in the representation of the vehicle on the display device,
    wherein the arrangement of the second graphics object of the vehicle component in the first graphics object of the vehicle corresponds to a present arrangement of the vehicle component in the vehicle.

2. The method of claim 1, wherein the operating state of the vehicle component is displayed by the method of representation of the second graphics object and/or by a further graphics object.

3. The method of claim 1, wherein the first graphics object represents the vehicle three-dimensionally.

4. The method of claim 1, wherein, when the representation of the first graphics object is changed, an image sequence is displayed in which the first graphics object changes from the first state into the second state.

5. The method of claim 4, wherein the image sequence comprises the representation of the vehicle is rotated in an animation to highlight the vehicle component.

6. The method of claim 1, wherein in the first state the first graphics object represents a nontransparent outer skin of the vehicle, and in that in the second state the first graphics object represents the vehicle in a transparent fashion, wherein the second graphics object of the vehicle component can be seen inside the vehicle if the vehicle component is arranged in the interior of the vehicle.

7. The method of claim 1, wherein the first graphics object represents the vehicle from behind if the vehicle component, on the operating state of which information is to be output, comprises the rear lights, and/or the first graphics object represents the vehicle from the front if the vehicle component, on the operating state of which information is to be output, comprises the front headlights.

8. The method of claim 1, wherein the viewing angle of the graphics representation of the vehicle is selected such that the vehicle component is located as far forward as possible from a point of view of the user in the representation.

9. The method of claim 8, wherein if the vehicle component is located externally of the vehicle then the viewing angle of the graphics representation of the vehicle is selected such that the vehicle component is presented directly to the user.

10. The method of claim 8, wherein if the vehicle component is located internally of the vehicle then the viewing angle of the graphics representation of the vehicle is selected to display a region that covers the vehicle component in a least amount of way.

11. The method of claim 1, wherein the representation can be either perspective or auto-stereoscopic.

12. The method of claim 11, wherein a specific viewing angle of a three-dimensional representation of the vehicle is calculated based on if the representation is perspective or auto-stereoscopic.

13. A device to display operating states of vehicle components of a vehicle, the device comprising:
    sensors to detect the operating states of the vehicle components;
    a display device to display graphics objects to visualize the operating states of at least one vehicle component; and
    a control device which is coupled to the sensors, wherein the control device generates graphics data for display of the graphics objects on the display device,
    wherein, the control device uses the graphics data to display a first graphics object including a representation of the vehicle in a first state w,
    wherein, the control device, in response to a determination that additional information pertaining to at least one vehicle component operating state should be output via the display device, determines a viewing angle that enables the representation of the vehicle in the first graphics object as to be represented in a second state in such a way that the at least one vehicle component with the operating state requiring additional information output is arranged at the front of the representation of the vehicle so as to appear most proximate to a user via the display device,
    wherein, the control device generates and displays a second graphics object that includes a graphics representation of the vehicle component,
    wherein, the control device changes the first graphics object to represent the vehicle in a second state based on the viewing angle so as to display the second graphics object so as to appear most approximate to the user in the representation of the vehicle on the display device,
    wherein, the arrangement of the second graphics object of the vehicle component in the first graphics object of the vehicle corresponds to a present arrangement of the vehicle component in the vehicle.

14. A vehicle having a device for displaying operating states as claimed in claim 13.

15. The device of claim 13, wherein the viewing angle of the graphics representation of the vehicle is selected such that the vehicle component is located as far forward as possible from a point of view of the user.

16. The device of claim 15, wherein if the vehicle component is located externally of the vehicle then the viewing angle of the graphics representation of the vehicle is selected such that the vehicle component is presented directly to the user.

17. The device of claim 15, wherein if the vehicle component is located internally of the vehicle then the viewing angle of the graphics representation of the vehicle is selected to display a region that covers the vehicle unit in a least amount of way.

18. The device of claim 13, wherein the representation can be either perspective or auto-stereoscopic.

19. The device of claim 18, wherein a specific viewing angle of a three-dimensional representation of the vehicle is calculated based on if the representation is perspective or auto-stereoscopic.

20. The device of claim 13, wherein, when the representation of the first graphics object is changed, an image sequence is displayed in which the first graphics object changes from the first state into the second state, and wherein the image sequence comprises the representation of the vehicle is rotated in an animation to highlight the vehicle component.

* * * * *